United States Patent
Brower et al.

(10) Patent No.: US 9,166,690 B2
(45) Date of Patent: Oct. 20, 2015

(54) POWER DISTRIBUTION MODULE(S) FOR DISTRIBUTED ANTENNA SYSTEMS, AND RELATED POWER UNITS, COMPONENTS, SYSTEMS, AND METHODS

(71) Applicants: Boyd Grant Brower, Keller, TX (US); Terry Dean Cox, Keller, TX (US); Jason Elliott Greene, Hickory, NC (US)

(72) Inventors: Boyd Grant Brower, Keller, TX (US); Terry Dean Cox, Keller, TX (US); Jason Elliott Greene, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 73 days.

(21) Appl. No.: 13/626,371

(22) Filed: Sep. 25, 2012

(65) Prior Publication Data

US 2014/0087742 A1    Mar. 27, 2014

(51) Int. Cl.
H04W 72/00 (2009.01)
H04B 10/2575 (2013.01)
H04B 10/80 (2013.01)

(52) U.S. Cl.
CPC .......... *H04B 10/2575* (2013.01); *H04B 10/808* (2013.01)

(58) Field of Classification Search
CPC ...... H04W 72/04; H04W 76/02; H04W 16/10
USPC ............ 455/450, 402, 456.5, 525, 554.1, 561
See application file for complete search history.

(56) References Cited

U.S. PATENT DOCUMENTS

| | | | |
|---|---|---|---|
| 5,436,827 A | 7/1995 | Gunn et al. | 364/187 |
| 5,682,256 A | 10/1997 | Motley et al. | 359/117 |
| 6,353,600 B1 | 3/2002 | Schwartz et al. | 370/328 |
| 6,405,018 B1 | 6/2002 | Reudink et al. | 455/20 |
| 6,496,290 B1 | 12/2002 | Lee | 359/136 |
| 7,072,586 B2 | 7/2006 | Aburakawa et al. | 398/115 |
| 7,144,255 B2 | 12/2006 | Seymour | 439/49 |
| 7,269,311 B2 | 9/2007 | Kim et al. | 385/24 |

(Continued)

FOREIGN PATENT DOCUMENTS

| | | | |
|---|---|---|---|
| EP | 0924881 A2 | 6/1999 | ............. H04B 10/12 |
| EP | 1173034 A1 | 4/2001 | ............... H04Q 7/30 |
| GB | 2275834 A | 9/1994 | ............. H04B 10/00 |
| WO | WO01/84760 | 11/2001 | ............... H04J 14/02 |
| WO | WO2009/014710 A1 | 1/2009 | ............. H04B 10/00 |
| WO | WO2010/132292 A1 | 11/2010 | |
| WO | WO2012/051227 A1 | 4/2012 | ............. H04L 12/10 |
| WO | WO2012/071367 A1 | 5/2012 | |

OTHER PUBLICATIONS

Patent Cooperation Treaty, International Search Report for International Application No. PCT/US2010/034005, Aug. 12, 2010, 2 pages.
"MDS SDX Packaged Stations Technical Manual", GD Digital Energy MDS, May 2011, XP002717790, 2 pages.
Patent Cooperation Treaty, International Search Report for PCT/US2013/058937, Jan. 14, 2014, 10 pages.

*Primary Examiner* — Nghi H Ly

(57) ABSTRACT

A power distribution module can be installed in and connected to a power unit for providing power to a power-consuming DAS component(s), such as a remote unit(s) (RU(s)) as a non-limiting example. The RU may include an antenna, and may sometimes be referred to as a remote antenna unit or RAU. Power from the power distribution module is distributed to any power-consuming DAS components connected to the power distribution modules including but not limited to remote units. The power distribution modules distribute power to the power-consuming DAS components to provide power for power-consuming components in the power-consuming DAS components. In a first configuration, the power distribution module uses two power links to provide power to a single RU. In a second configuration, the power distribution module uses two power links to provide power to two RUs.

20 Claims, 12 Drawing Sheets

(56) References Cited

U.S. PATENT DOCUMENTS

| | | |
|---|---|---|
| 7,388,892 B2 | 6/2008 | Nishiyama et al. ........ 372/38.02 |
| 8,155,525 B2 | 4/2012 | Cox ............................. 398/115 |
| 2005/0226625 A1 | 10/2005 | Wake et al. ................... 398/115 |
| 2008/0002614 A1* | 1/2008 | Hanabusa et al. ............. 370/328 |
| 2008/0070502 A1 | 3/2008 | George et al. ................ 455/41.2 |
| 2008/0080863 A1 | 4/2008 | Sauer et al. ..................... 398/70 |
| 2008/0186143 A1 | 8/2008 | George et al. ................ 340/10.3 |
| 2010/0054746 A1 | 3/2010 | Logan ........................... 398/115 |
| 2010/0290787 A1 | 11/2010 | Cox .............................. 398/115 |
| 2011/0268446 A1 | 11/2011 | Cune et al. ..................... 398/79 |
| 2012/0293390 A1* | 11/2012 | Shoemaker et al. .......... 343/853 |

\* cited by examiner

POWER DISTRIBUTION MODULE(S) FOR DISTRIBUTED ANTENNA SYSTEMS, AND RELATED POWER UNITS, COMPONENTS, SYSTEMS, AND METHODS

RELATED APPLICATION

The present application is related to PCT Application No. PCT/US11/61761 filed on Nov. 22, 2011, entitled "Power Distribution Module(s) Capable of Hot Connection and/or Disconnection for Distributed Antenna Systems, and Related Power Units, and Methods," which is incorporated herein by reference in its entirety.

This application is also related to U.S. patent application Ser. No. 12/466,514 filed on May 15, 2009 and entitled "Power Distribution Devices, Systems, and Methods For Radio-Over-Fiber (RoF) Distributed Communication," which is incorporated herein by reference in its entirety.

BACKGROUND

1. Field of the Disclosure

The technology of the disclosure relates to distributing power to remote units in a distributed antenna system.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications or antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility. However, it may be desirable to employ optical fiber to distribute communication signals. Benefits of optical fiber include increased bandwidth.

One type of distributed antenna system for creating antenna coverage areas includes distribution of RF communications signals over an electrical conductor medium, such as coaxial cable or twisted pair wiring. Another type of distributed antenna system for creating antenna coverage areas, called "Radio-over-Fiber" or "RoF," utilizes RF communications signals sent over optical fibers. Both types of systems can include head-end equipment coupled to a plurality of remote units (RUs), which may include an antenna and may be referred to as an RU. The RUs each provides antenna coverage areas. The RUs can each include RF transceivers coupled to an antenna to transmit RF communications signals wirelessly, wherein the RUs are coupled to the head-end equipment via the communication medium. The RF transceivers in the remote units are transparent to the RF communications signals. The antennas in the RUs also receive RF signals (i.e., electromagnetic radiation) from clients in the antenna coverage area. The RF signals are then sent over the communication medium to the head-end equipment. In optical fiber or RoF distributed antenna systems, the RUs convert incoming optical RF signals from an optical fiber downlink to electrical RF signals via optical-to-electrical (O/E) converters, which are then passed to the RF transceiver. The RUs also convert received electrical RF communications signals from clients via the antennas to optical RF communications signals via electrical-to-optical (E/O) converters. The optical RF signals are then sent over an optical fiber uplink to the head-end equipment.

The RUs contain power-consuming components, such as the RF transceiver, to transmit and receive RF communications signals and thus require power to operate. In the situation of an optical fiber-based distributed antenna system, the RUs may contain O/E and E/O converters that also require power to operate. As an example, the RU may contain a housing that includes a power supply to provide power to the RUs locally at the RU. The power supply may be configured to be connected to a power source, such as an alternating current (AC) power source, and convert AC power into a direct current (DC) power signal. Alternatively, power may be provided to the RUs from remote power supplies. The remote power supplies may be configured to provide power to multiple RUs. It may be desirable to provide these power supplies in modular units or devices that may be easily inserted or removed from a housing to provide power. Providing modular power distribution modules allows power to more easily be configured as needed for the distributed antenna system. For example, a remotely located power unit may be provided that contains a plurality of ports or slots to allow a plurality of power distribution modules to be inserted therein. The power unit may have ports that allow the power to be provided over an electrical conductor medium to the RUs. Thus, when a power distribution module is inserted in the power unit in a port or slot that corresponds to a given RU, power from the power distribution module is supplied to the RU.

RUs may also provide wired communication ports or provide other services, each of which may require power consumption at the RU. Regulations in the United States require that no more than one hundred watts of power be provided over the electrical conductor medium. However, certain RUs may require more than one hundred watts to support all the services within the RU.

SUMMARY OF THE DETAILED DESCRIPTION

Embodiments disclosed in the detailed description include power distribution modules in distributed antenna systems (DASs). Related power units, components, and methods are also disclosed. In embodiments disclosed herein, the power distribution modules can be installed in and connected to a power unit for providing power to a power-consuming DAS component(s), such as a remote unit(s) (RU(s)) as a non-limiting example. The RU may include an antenna, and may sometimes be referred to as a remote antenna unit or RAU. Power from the power distribution module is distributed to any power-consuming DAS components connected to the power distribution modules including but not limited to remote units. The power distribution modules distribute power to the power-consuming DAS components to provide power for power-consuming components in the power-consuming DAS components. In a first configuration, the power distribution module uses two power links to provide power to a single RU. In a second configuration, the power distribution module uses two power links to provide power to two RUs. In this fashion, compliance with power limitations on the power links may be achieved while still providing more than 100 W to an RU if required.

In this regard in one embodiment, a remote unit for use in a distributed antenna system is provided. The remote unit comprises a first power input configured to receive a first power signal from a power distribution module through a first power medium and a second power input electrically isolated from the first power input, the second power input configured to receive a second power signal from the power distribution module through a second power medium. The remote unit further comprises a communications module configured to receive power from at least one of the first power input and the second power input to communicate radio frequency (RF) communications with client devices through an antenna defining an antenna coverage area associated with the remote unit and at least one wired service port configured to couple to at least one of the first power input and the second power input to distribute power to an external module coupled to the at least one wired service port.

In this regard, in a further embodiment, a distributed communication system is provided. The distributed communication system comprises a power distribution module for distributing power. The power distribution module comprises a power supply configured to provide a plurality of power outputs and a plurality of power controllers each connected to a respective one of the plurality of power outputs in parallel to provide split power from the power supply to a respective power controller output. Each power controller output is coupled to a respective power output port, at least two power output ports configured to be coupled to a single remote unit in a first connection configuration and each power controller output configured to be coupled to a respective remote unit in a second configuration. The distributed communication system also comprises a remote unit (RU). The RU comprises a first power input configured to receive a first power signal from a power distribution module through a first power medium and a second power input electrically isolated from the first power input, the second power input configured to receive a second power signal from the power distribution module through a second power medium. The RU also comprises a communications module configured to receive power from at least one of the first power input and the second power input to communicate radio frequency (RF) communications with client devices through an antenna defining an antenna coverage area associated with the remote unit and at least one wired service port configured to coupled to at least one of the first power input and the second power input to distribute power to an external module coupled to the at least one wired service port.

In this regard, in a further embodiment, a distributed antenna system for distributing communications and power signals is provided. The distributed antenna system comprises one or more remote units (RU). Each RU comprises a first power input configured to receive a first power signal from a power distribution module through a first power medium and a second power input electrically isolated from the second power input, the second power input configured to receive a second power signal from the power distribution module through a second power medium. Each RU also comprises a communications module configured to receive power from at least one of the first power input and the second power input to communicate radio frequency (RF) communications with client devices through an antenna defining an antenna coverage area associated with the remote unit and at least one wired service port configured to couple to at least one of the first power input and the second power input to distribute power to an external module coupled to the at least one wired service port.

The distributed antenna system further comprises head-end equipment comprising a radio-frequency (RF) communications interface configured to receive downlink RF communication signals for at least one RF communications service and distribute the downlink RF communications signals to the one or more remote units over a communications medium. The RUs are configured to receive the downlink RF communication signals from the head-end equipment for the at least one RF communications service and distribute the downlink RF communications signals to at least one client device.

The distributed antenna system further comprises a power distribution module disposed between the head-end equipment and the at least one remote unit for distributing power to the at least one remote unit. The power distribution module comprises a communications interface configured to receive and pass through the communications medium to the at least one remote unit and a power supply configured to provide a plurality of power outputs. The power distribution module further comprises a plurality of power controllers each connected to a respective one of the plurality of power outputs in parallel to provide split power from the power supply to a respective power controller output, and each power controller output is coupled to a respective power output port, at least two power output ports configured to be coupled to a single one of the one or more remote units in a first connection configuration and each power controller output configured to be coupled to a respective remote unit of the one or more remote units in a second configuration.

In this regard, a method for providing power is provided. The method comprises providing a power distribution module with a plurality of power outputs and connecting a plurality of power controllers to respective ones of the plurality of power outputs in parallel. The method further comprises coupling each power controller to a respective power output port. In a first configuration, the method provides power to a single remote unit through a plurality of power output ports and in a second configuration, the method provides power to a plurality of remote units through the plurality of power output ports.

The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include power distribution modules in distributed antenna systems (DASs). Related power units, components, and methods are also disclosed. In embodiments disclosed herein, the power distribution modules can be installed in and connected to a power unit for providing power to a power-consuming DAS component(s), such as a remote unit(s) (RU(s)) as a non-limiting example. The RU may include an antenna, and may sometimes be referred to as a remote antenna unit or RAU. Power from the power distribution module is distributed to any power-consuming DAS components connected to the power distribution modules including but not limited to remote units. The power distribution modules distribute power to the power-consuming DAS components to provide power for power-consuming components in the power-consuming DAS components.

Figure 1:
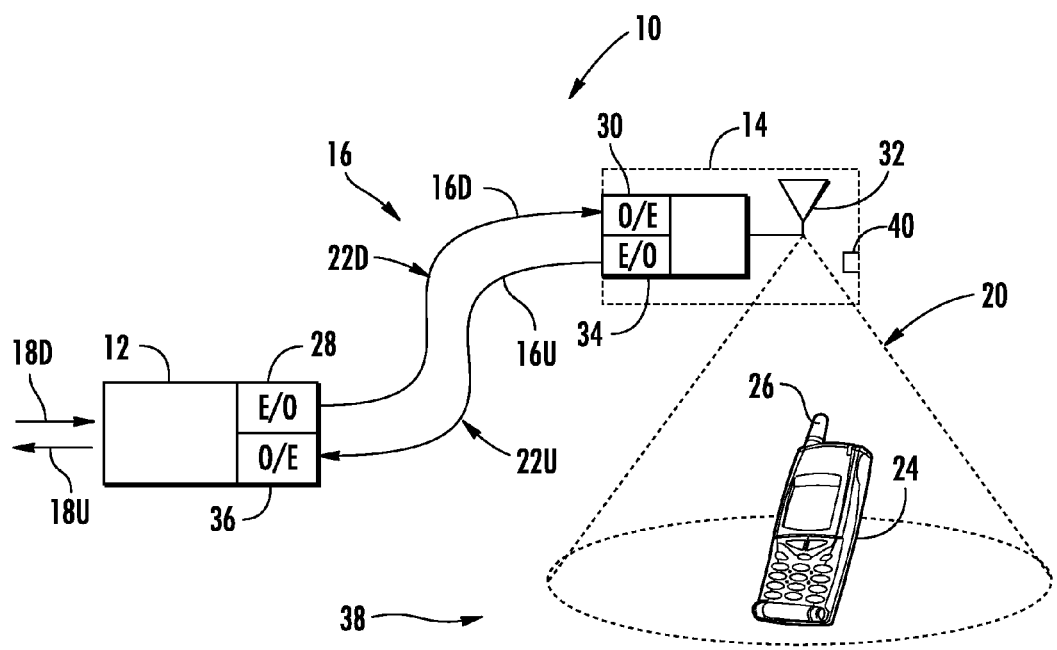
FIG. 1 is a schematic diagram of an exemplary distributed antenna system.
Figure 2A:
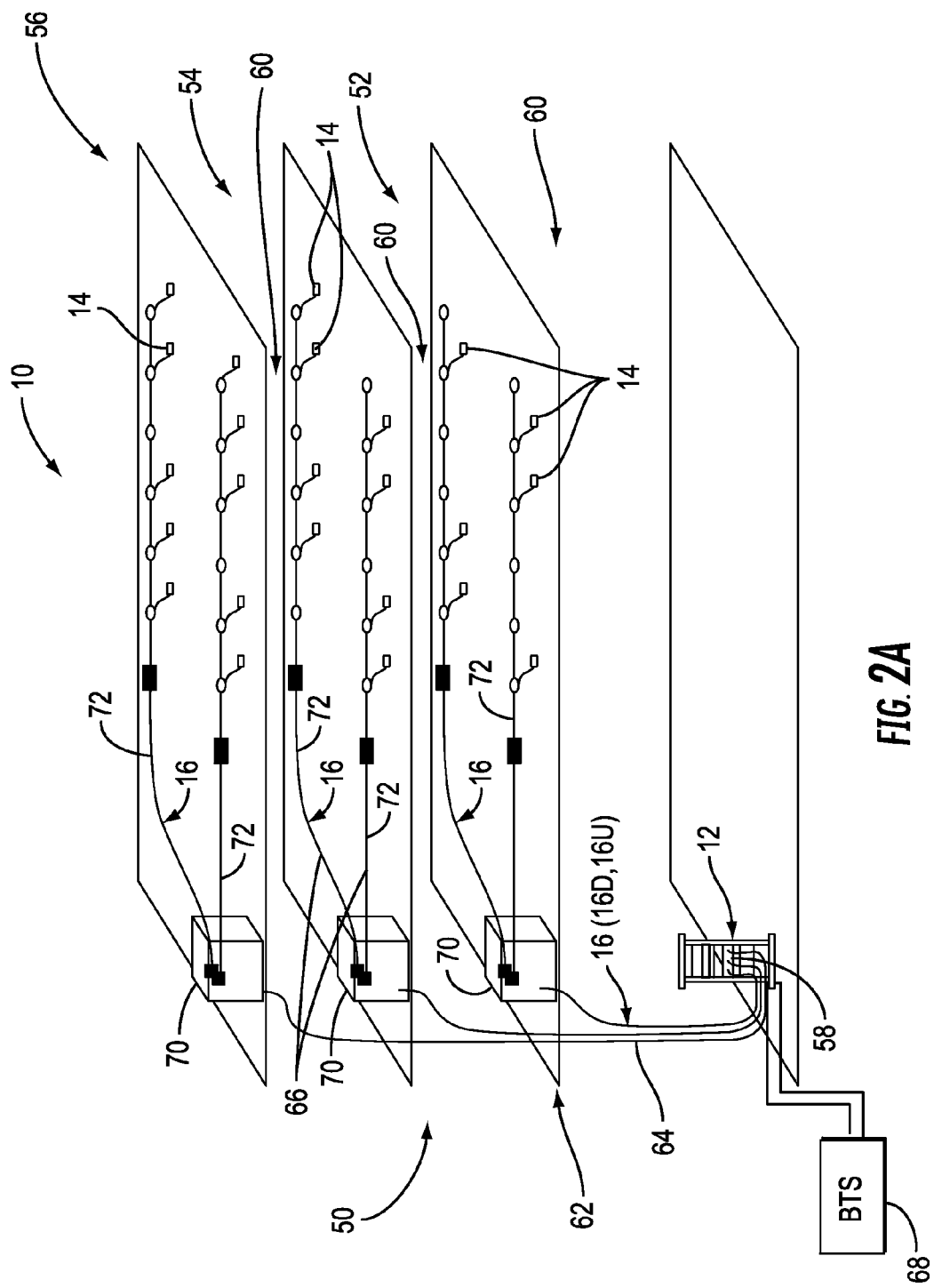
FIG. 2A is a partially schematic cut-away diagram of an exemplary building infrastructure in which the distributed antenna system in FIG. 1 can be employed.
Figure 2B:
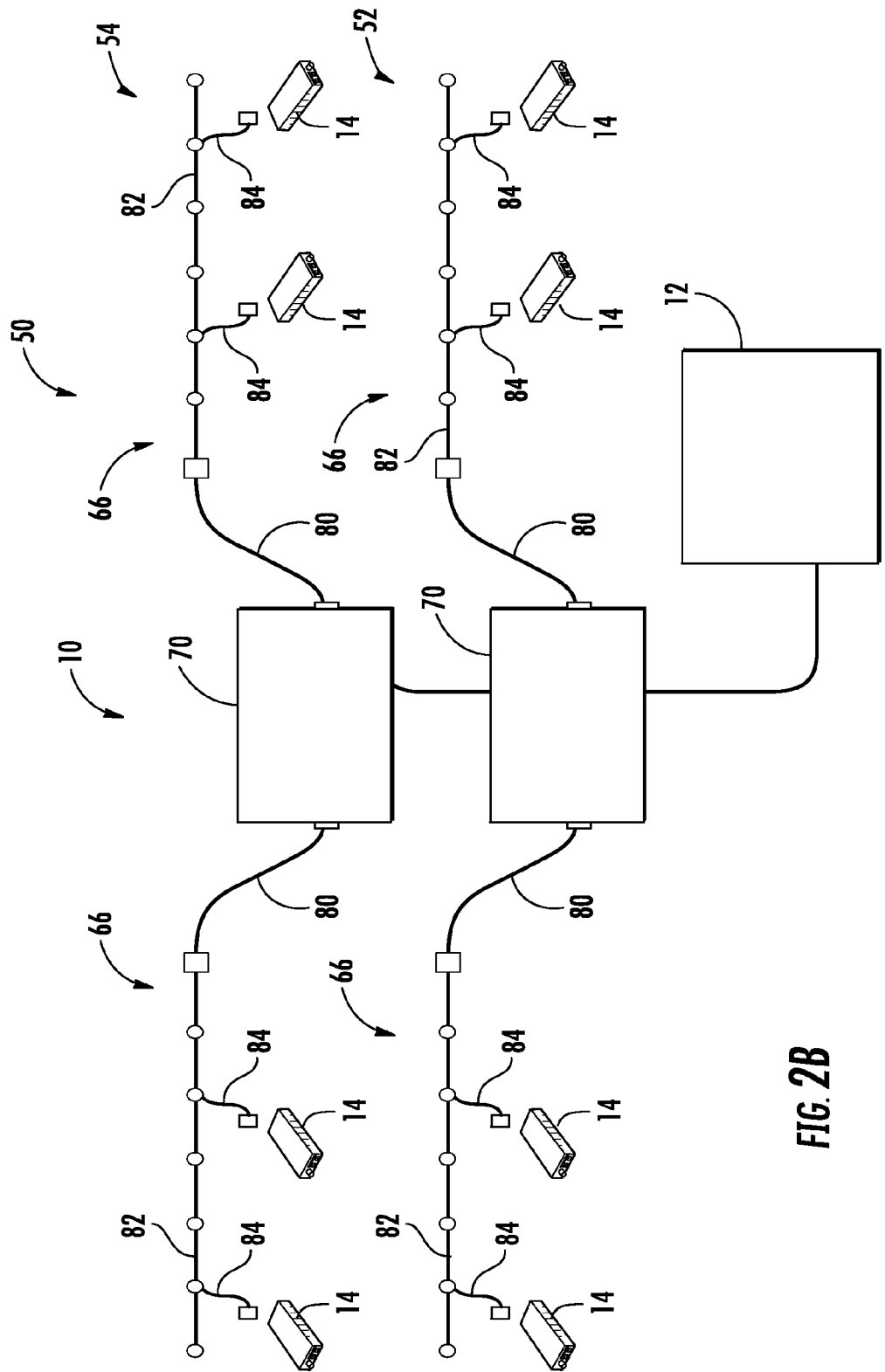
FIG. 2B is an alternative diagram of the distributed antenna system in FIG. 2A.
Figure 3:
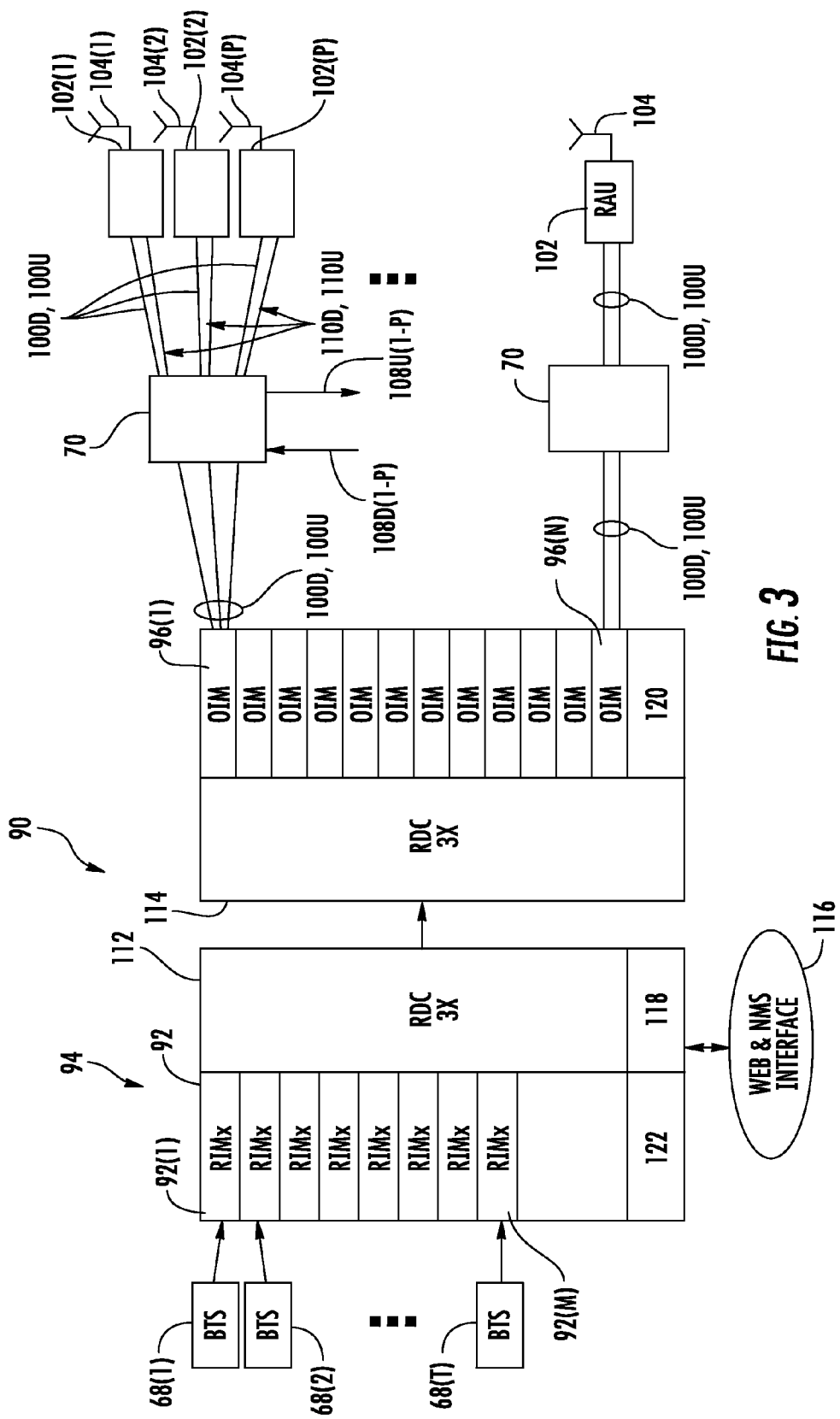
FIG. 3 is a schematic diagram of providing digital data services and RF communication services to remote units (RUs) or other remote communications devices in the distributed antenna system.

Before discussing examples of power distribution modules, exemplary distributed antenna systems capable of distributing RF communications signals to distributed or remote units (RUs) are first described with regard to FIGS. 1-3. It should be appreciated that in an exemplary embodiment the remote units may contain antennas such that the remote unit is a remote antenna unit and may be referred to as an RAU. The distributed antenna systems in FIGS. 1-3 can include power units located remotely from RUs that provide power to the RUs for operation. Embodiments of power distribution modules in distributed antenna systems, including the distributed antenna systems in FIGS. 1-3, begin with FIG. 4. The distributed antenna systems in FIGS. 1-3 discussed below include distribution of radio frequency (RF) communications signals; however, the distributed antenna systems are not limited to distribution of RF communications signals. Also note that while the distributed antenna systems in FIGS. 1-3 discussed below include distribution of communications signals over optical fiber, these distributed antenna systems are not limited to distribution over optical fiber. Distribution mediums could also include, but are not limited to, coaxial cable, twisted-pair conductors, wireless transmission and reception, and any combination thereof. Also, any combination can be employed that also involves optical fiber for portions of the distributed antenna system.

In this regard, FIG. 1 is a schematic diagram of an embodiment of a distributed antenna system. In this embodiment, the system is an optical fiber-based distributed antenna system 10. The distributed antenna system 10 is configured to create one or more antenna coverage areas for establishing communications with wireless client devices located in the RF range of the antenna coverage areas. The distributed antenna system 10 provides RF communication services (e.g., cellular services). In this embodiment, the distributed antenna system 10 includes head-end equipment (HEE) 12 such as a head-end unit (HEU), one or more remote units (RUs) 14, and an optical fiber 16 that optically couples the HEE 12 to the RU 14. The RU 14 is a type of remote communications unit. In general, a remote communications unit can support wireless communications, wired communications, or both. The RU 14 can support wireless communications and may also support wired communications through wired service port 40. The HEE 12 is configured to receive communications over downlink electrical RF signals 18D from a source or sources, such as a network or carrier as examples, and provide such communications to the RU 14. The HEE 12 is also configured to return communications received from the RU 14, via uplink electrical RF signals 18U, back to the source or sources. In this regard in this embodiment, the optical fiber 16 includes at least one downlink optical fiber 16D to carry signals communicated from the HEE 12 to the RU 14 and at least one uplink optical fiber 16U to carry signals communicated from the RU 14 back to the HEE 12.

One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the optical fiber-based distributed antenna system 10 either in conjunction with RF communications signals or not.

The optical fiber-based distributed antenna system 10 has an antenna coverage area 20 that can be disposed about the RU 14. The antenna coverage area 20 of the RU 14 forms an RF coverage area 38. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RU 14, to in turn be communicated to the client device 24 in the antenna coverage area 20 formed by the RU 14, the HEE 12 includes a radio interface in the form of an electrical-to-optical (E/O) converter 28. The E/O converter 28 converts the downlink electrical RF signals 18D to downlink optical RF signals 22D to be communicated over the downlink optical fiber 16D. The RU 14 includes an optical-to-electrical (O/E) converter 30 to convert received downlink optical RF signals 22D back to electrical RF signals to be communicated wirelessly through an antenna 32 of the RU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source.

To provide further exemplary illustration of how a distributed antenna system can be deployed indoors, FIG. 2A is provided. FIG. 2A is a partially schematic cut-away diagram of a building infrastructure 50 employing an optical fiber-based distributed antenna system. The system may be the optical fiber-based distributed antenna system 10 of FIG. 1. The building infrastructure 50 generally represents any type of building in which the optical fiber-based distributed antenna system 10 can be deployed. As previously discussed with regard to FIG. 1, the optical fiber-based distributed antenna system 10 incorporates the HEE 12 to provide various types of communication services to coverage areas within the building infrastructure 50, as an example.

For example, as discussed in more detail below, the distributed antenna system 10 in this embodiment is configured to receive wireless RF signals and convert the RF signals into RoF signals to be communicated over the optical fiber 16 to multiple RUs 14. The optical fiber-based distributed antenna system 10 in this embodiment can be, for example, an indoor distributed antenna system (IDAS) to provide wireless service inside the building infrastructure 50. These wireless signals can include cellular service, wireless services such as RFID tracking, Wireless Fidelity (WiFi), local area network (LAN), WLAN, public safety, wireless building automations, and combinations thereof, as examples.

With continuing reference to FIG. 2A, the building infrastructure 50 in this embodiment includes a first (ground) floor 52, a second floor 54, and a third floor 56. The floors 52, 54, 56 are serviced by the HEE 12 through a main distribution frame 58 to provide antenna coverage areas 60 in the building infrastructure 50. Only the ceilings of the floors 52, 54, 56 are shown in FIG. 2A for simplicity of illustration. In the example embodiment, a main cable 62 has a number of different sections that facilitate the placement of a large number of RUs 14 in the building infrastructure 50. Each RU 14 in turn services its own coverage area in the antenna coverage areas 60. The main cable 62 can include, for example, a riser cable 64 that carries all of the downlink and uplink optical fibers 16D, 16U to and from the HEE 12. The riser cable 64 may be routed through a power unit 70. The power unit 70 may also be configured to provide power to the RUs 14 via an electrical power line provided inside an array cable 72, or tail cable or home-run tether cable as other examples, and distributed with the downlink and uplink optical fibers 16D, 16U to the RUs 14. For example, as illustrated in the building infrastructure 50 in FIG. 2B, a tail cable 80 may extend from the power units 70 into an array cable 82. Downlink and uplink optical fibers in tether cables 84 of the array cables 82 are routed to each of the RUs 14, as illustrated in FIG. 2B. The main cable 62 can include one or more multi-cable (MC) connectors adapted to connect select downlink and uplink optical fibers 16D, 16U, along with an electrical power line, to a number of optical fiber cables 66.

The main cable 62 enables multiple optical fiber cables 66 to be distributed throughout the building infrastructure 50 (e.g., fixed to the ceilings or other support surfaces of each floor 52, 54, 56) to provide the antenna coverage areas 60 for the first, second, and third floors 52, 54, and 56. In an example embodiment, the HEE 12 is located within the building infrastructure 50 (e.g., in a closet or control room), while in another example embodiment, the HEE 12 may be located outside of the building infrastructure 50 at a remote location. A base transceiver station (BTS) 68, which may be provided by a second party such as a cellular service provider, is connected to the HEE 12, and can be co-located or located remotely from the HEE 12. A BTS is any station or signal source that provides an input signal to the HEE 12 and can receive a return signal from the HEE 12.

In a typical cellular system, for example, a plurality of BTSs is deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell or femtocell as other examples.

The optical fiber-based distributed antenna system 10 in FIGS. 1-2B and described above provides point-to-point communications between the HEE 12 and the RU 14. A multi-point architecture is also possible as well. With regard to FIGS. 1-2B, each RU 14 communicates with the HEE 12 over a distinct downlink and uplink optical fiber pair to provide the point-to-point communications. Whenever an RU 14 is installed in the optical fiber-based distributed antenna system 10, the RU 14 is connected to a distinct downlink and uplink optical fiber pair connected to the HEE 12. The downlink and uplink optical fibers 16D, 16U may be provided in a fiber optic cable. Multiple downlink and uplink optical fiber pairs can be provided in a fiber optic cable to service multiple RUs 14 from a common fiber optic cable.

For example, with reference to FIG. 2A, RUs 14 installed on a given floor 52, 54, or 56 may be serviced from the same optical fiber 16. In this regard, the optical fiber 16 may have multiple nodes where distinct downlink and uplink optical fiber pairs can be connected to a given RU 14. One downlink optical fiber 16D could be provided to support multiple channels each using wavelength-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

FIG. 3 is a schematic diagram of another exemplary optical fiber-based distributed antenna system 90 that may be employed according to the embodiments disclosed herein to provide RF communication services. In this embodiment, the optical fiber-based distributed antenna system 90 includes optical fiber for distributing RF communication services. The optical fiber-based distributed antenna system 90 in this embodiment is comprised of three (3) main components. One or more radio interfaces provided in the form of radio interface modules (RIMs) 92(1)-92(M) in this embodiment are provided in HEE 94 to receive and process downlink electrical RF communications signals prior to optical conversion into downlink optical RF communications signals. The RIMs 92(1)-92(M) provide both downlink and uplink interfaces. The processing of the downlink electrical RF communications signals can include any of the processing previously described above in the HEE 12 in FIGS. 1-2A. The notations and "1-M" indicate that any number of the referenced component, 1-M may be provided. The HEE 94 is configured to accept a plurality of RIMs 92(1)-92(M) as modular components that can easily be installed and removed or replaced in the HEE 94. In one embodiment, the HEE 94 is configured to support up to eight (8) RIMs 92(1)-92(M).

With continuing reference to FIG. 3, each RIM 92(1)-92(M) can be designed to support a particular type of radio source or range of radio sources (i.e., frequencies) to provide flexibility in configuring the HEE 94 and the optical fiber-based distributed antenna system 90 to support the desired radio sources. For example, one RIM 92 may be configured to support the Personal Communication Services (PCS) radio band. Another RIM 92 may be configured to support the 700 MHz radio band. In this example, by inclusion of these RIMs 92, the HEE 94 would be configured to support and distribute RF communications signals on both PCS and LTE 700 radio bands. RIMs 92 may be provided in the HEE 94 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 92 may be provided in the HEE 94 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD). RIMs 92 may be provided in the HEE 94 that support any frequencies desired referenced above as non-limiting examples.

With continuing reference to FIG. 3, the downlink electrical RF communications signals are provided to a plurality of optical interfaces provided in the form of optical interface modules (OIMs) 96(1)-96(N) in this embodiment to convert the downlink electrical RF communications signals into downlink optical RF communications signals 100D. The notation "1-N" indicates that any number of the referenced component 1-N may be provided. The OIMs 96 may be configured to provide one or more optical interface components (OICs) that contain O/E and E/O converters, as will be described in more detail below. The OIMs 96 support the radio bands that can be provided by the RIMs 92, including the examples previously described above. Thus, in this embodiment, the OIMs 96 may support a radio band range from 400 MHz to 2700 MHz, as an example, so providing different types or models of OIMs 96 for narrower radio bands to support possibilities for different radio band-supported RIMs 92 provided in the HEE 94 is not required. Further, the OIMs 96 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 96(1)-96(N) each include E/O converters to convert the downlink electrical RF communications signals to downlink optical RF communications signals 100D. The downlink optical RF communications signals 100D are communicated over downlink optical fiber(s) to a plurality of RUs 102(1)-102(P). The notation "1-P" indicates that any number of the referenced component 1-P may be provided. O/E converters provided in the RUs 102(1)-102(P) convert the downlink optical RF communications signals 100D back into downlink electrical RF communications signals, which are provided over downlinks coupled to antennas 104(1)-104(P) in the RUs 102(1)-102(P) to client devices 24 (FIG. 1) in the reception range of the antennas 104(1)-104(P).

E/O converters are also provided in the RUs 102(1)-102(P) to convert uplink electrical RF communications signals received from client devices through the antennas 104(1)-104(P) into uplink optical RF communications signals 100U to be communicated over uplink optical fibers to the OIMs 96(1)-96(N). The OIMs 96(1)-96(N) include O/E converters that convert the uplink optical RF communications signals 100U into uplink electrical RF communications signals that are processed by the RIMs 92(1)-92(M) and provided as uplink electrical RF communications signals. Downlink electrical digital signals 108D(1)-108D(P) communicated over downlink electrical medium or media (hereinafter "medium") 110D are provided to the RUs 102(1)-102(P), separately from the RF communication services, as well as uplink electrical digital signals 108U(1)-108U(P) communicated over uplink electrical medium 110U, as also illustrated in FIG. 3. Power may be provided in the downlink and/or uplink electrical medium 110D and/or 110U to the RUs 102(1)-102(P).

In one embodiment, up to thirty-six (36) RUs 102 can be supported by the OIMs 96, three RUs 102 per OIM 96 in the optical fiber-based distributed antenna system 90 in FIG. 3.

The optical fiber-based distributed antenna system 90 is scalable to address larger deployments. In the illustrated optical fiber-based distributed antenna system 90, the HEE 94 is configured to support up to thirty six (36) RUs 102 and fit in 6 U rack space (U unit meaning 1.75 inches of height). The downlink operational input power level can be in the range of −15 dBm to 33 dBm. The adjustable uplink system gain range can be in the range of +15 dB to −15 dB. The RF input interface in the RIMs 92 can be duplexed and simplex, N-Type. The optical fiber-based distributed antenna system can include sectorization switches to be configurable for sectorization capability, as discussed in U.S. patent application Ser. No. 12/914,585 filed on Oct. 28, 2010, and entitled "Sectorization In Distributed Antenna Systems, and Related Components and Method," which is incorporated herein by reference in its entirety.

In another embodiment, an exemplary RU 102 may be configured to support up to four (4) different radio bands/carriers (e.g. ATT, VZW, TMobile, Metro PCS: 700LTE/850/1900/2100). Radio band upgrades can be supported by adding remote expansion units over the same optical fiber (or upgrade to MIMO on any single band). The RUs 102 and/or remote expansion units may be configured to provide external filter interface to mitigate potential strong interference at 700 MHz band (Public Safety, CH51,56); Single Antenna Port (N-type) provides DL output power per band (Low bands (<1 GHz): 14 dBm, High bands (>1 GHz): 15 dBm); and satisfies the UL System RF spec (UL Noise Figure: 12 dB, UL IIP3: −5 dBm, UL AGC: 25 dB range).

As further illustrated in FIG. 3, a power supply module (PSM) 118 may provide power to the RIMs 92(1)-92(M) and radio distribution cards (RDCs) 112 that distribute the RF communications from the RIMs 92(1)-92(M) to the OIMs 96(1)-96(N) through RDCs 114. In one embodiment, the RDCs 112, 114 can support different sectorization needs. A PSM 120 may also be provided to provide power to the OIMs 96(1)-96(N). An interface 116, which may include web and network management system (NMS) interfaces, may also be provided to allow configuration and communication to the RIMs 92(1)-92(M) and other components of the optical fiber-based distributed antenna system 90. A microcontroller, microprocessor, or other control circuitry, called a head-end controller (HEC) 122 may be included in HEE 94 to provide control operations for the HEE 94.

RUs, including the RUs 14, 102 discussed above, contain power-consuming components for transmitting and receiving RF communications signals. In the situation of an optical fiber-based distributed antenna system, the RUs 14, 102 may contain O/E and E/O converters that also require power to operate. As an example, a RU 14, 102 may contain a power unit that includes a power supply to provide power to the RUs 14, 102 locally at the RU 14, 102. Alternatively, power may be provided to the RUs 14, 102 from power supplies provided in remote power units. In either scenario, it may be desirable to provide these power supplies in modular units or devices that may be easily inserted or removed from a power unit. Providing modular power distribution modules allows power to more easily be configured as needed for the distributed antenna system.

Figure 4:
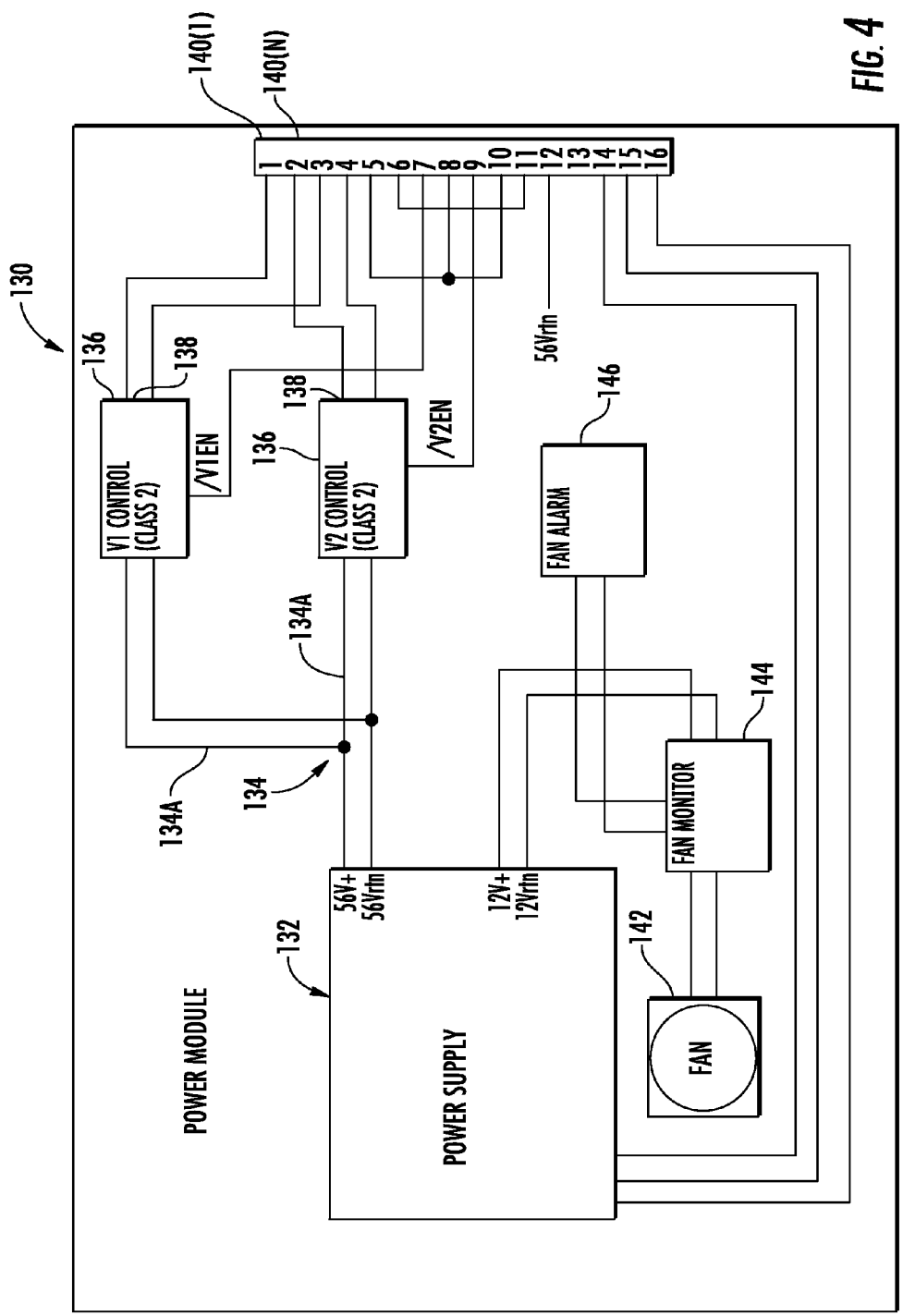
FIG. 4 is a schematic diagram of an exemplary power distribution module that is supported by an exemplary power unit.

In this regard, FIG. 4 is a schematic diagram of an exemplary power distribution module 130 that can be employed to provide power to the RUs 14, 102 or other power-consuming DAS components, including those described above. In this embodiment, the power distribution module 130 may be the power unit 70 previously described above to remotely provide power to the RUs 14, 102. The power unit 70 may be comprised of a chassis or other housing that is configured to support power distribution modules 130. The power distribution module 130 may include a power supply unit 132 that has a plurality of outputs 134. In an exemplary embodiment, the plurality of outputs 134 is actually a single output that is then split into a plurality of parallel lines 134A. A power controller 136 is coupled to each of the plurality of outputs 134 (or parallel lines 134A). The parallel lines 134A act to split power from the power supply unit 132 to each respective power controller 136. Each power controller 136 has a respective power controller output 138 which is coupled to a respective power output port 140(1)-(N).

With continuing reference to FIG. 4, in an exemplary embodiment, the power supply unit 132 may generate 150 W of power. In another embodiment, the power supply unit 132 may generate 200 W of power. The power lines extending from the power supply unit 132 to the RU 102 are limited by regulation to a maximum power level of 100 W. By splitting the power from the power supply unit 132, each line coupled to a respective power output port 140 may be limited to a level at or below 100 W, thus complying with the regulations. If the number of parallel lines 134A does not split the power to a desired level, the power controllers 136 may further limit the power supplied to each power output port 140 to 100 W or less. The power output ports 140 may be a connector or may form part of a connector 252 (FIG. 7) as needed or desired.

With continuing reference to FIG. 4, the power distribution module 130 may include a fan 142 powered by the power supply unit 132. In a further embodiment, the fan 142 may have a fan monitor 144, which monitors activity of the fan 142 and sends a signal to a fan alarm 146 in the event of anomalous behavior of the fan 142.

The power distribution module 130 may be configured to support multiple power supply units 132. Each power distribution module 130 may be configured to provide power to multiple RUs 14, 102.

Figure 5A:
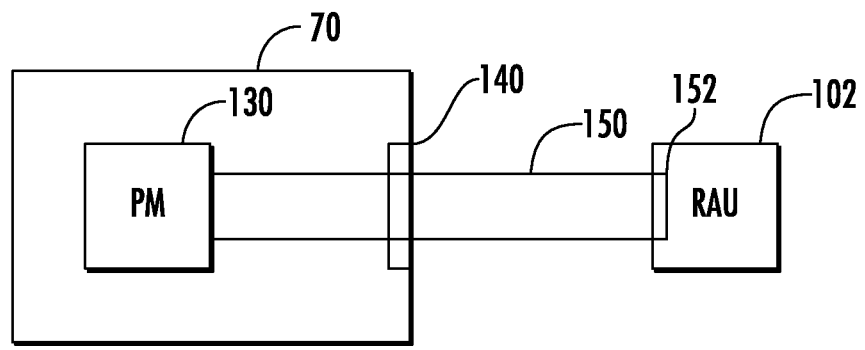
FIG. 5A is a system level diagram showing a first configuration of the power distribution module for supplying power to a single RU.
Figure 5B:
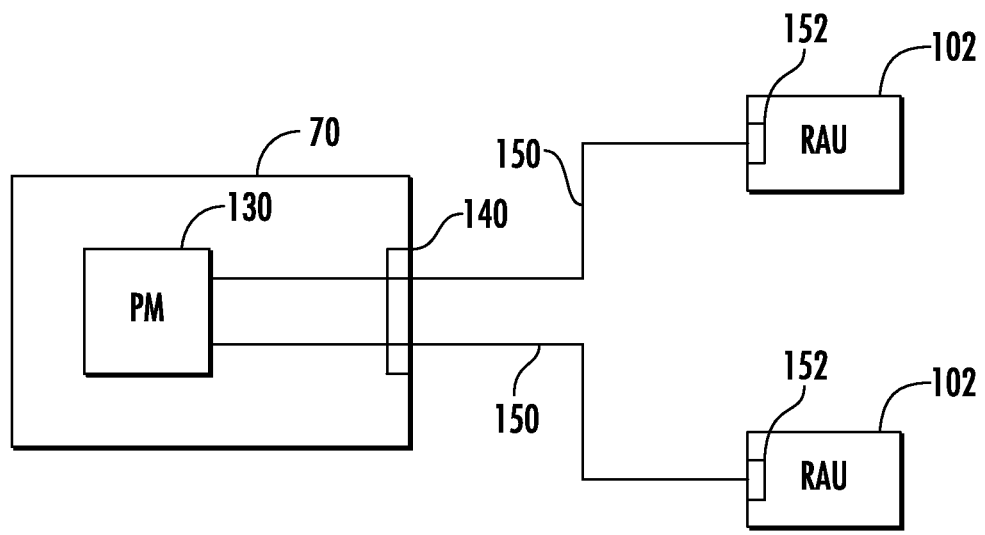
FIG. 5B is a system level diagram showing a second configuration of the power distribution module for supplying power to 2 RUs.

In a first configuration, the power distribution module 130 is configured to provide more than 100 W to a single RU 102. However, as noted, the regulations require that the power on any given line be less than 100 W. Thus, as illustrated in FIG. 5A, two power cables 150 couple the power distribution module 130 to the RU 102. In a second configuration, the RUs 102 do not need more than 100 W of power, and thus, as illustrated in FIG. 5B, the power distribution module 130 is coupled to two RUs 102 through the respective power cables 150.

Figure 6:
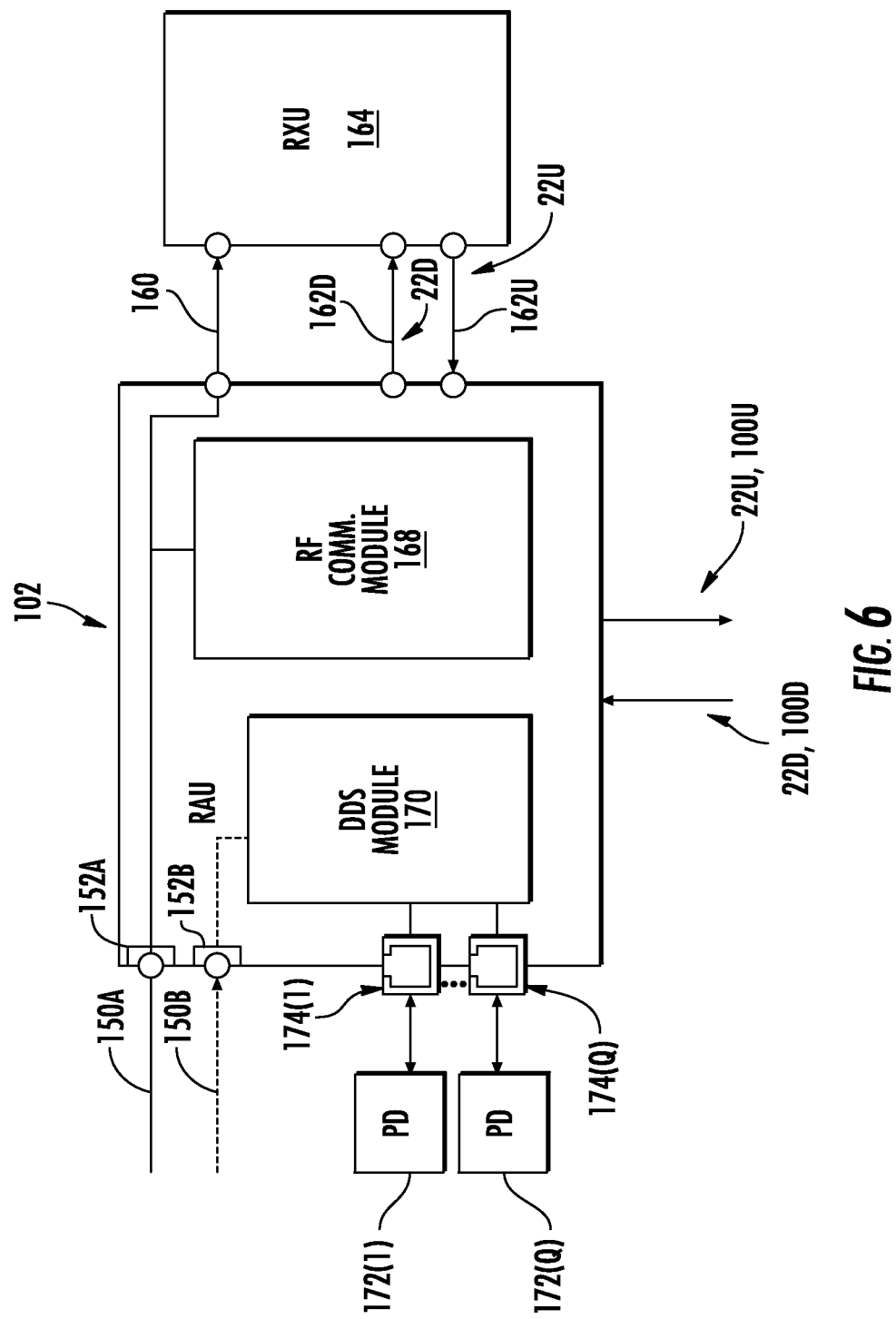
FIG. 6 is a schematic diagram of an exemplary RU configured with power-consuming components for providing radio frequency (RF) communications services, digital data services, external power to digital data service devices, and a remote expansion unit.

FIG. 6 is a schematic diagram of an exemplary RU 102 configured with power-consuming components. The RU 102 is configured in a first embodiment to receive power over a single power cable 150A routed to the RU 102 from the power distribution module 130. As a non-limiting example, the power cable 150 may provide a voltage of between forty-eight (48) and sixty (60) Volts at a power rating of between eighty (80) to one hundred (100) Watts. In this example, the RU 102 includes an RF communications module 168 for providing RF communications services. The RF communications module 168 requires power to operate in this embodiment and receives power from the power cable 150A. Power from the power cable 150A may be routed directly to the RF communications module 168, or indirectly through another module. The RF communications module 168 may include any of the previously referenced components to provide RF communications services, including O/E and E/O conversion.

With continuing reference to FIG. 6, the RU 102 may also include a DDS module 170 to provide media conversion (e.g., O/E and E/O conversions) and route digital data services received to externally connected power-consuming devices (PDs) 172(1)-172(Q) configured to receive digital data services. Power from a second power cable 150B may be routed to the RF communications module 168, and from the RF communications module 168 to the DDS module 170. Note that the power cables 150A, 150B may be conjoined as a single multiconductor cable (e.g., a ribbon cable) so long as the conductors within the multiconductor cable are electrically isolated. With reference to FIG. 6, the digital data services are routed by the DDS module 170 through communications ports 174(1)-174(Q) provided in the RU 102. As a non-limiting example, the communications ports 174(1)-174(Q) may be RJ-45 connectors. The communications ports 174(1)-174(Q) may be powered, meaning that a portion of the power from the power cable 150 is provided to the powered communications ports 174(1)-174(Q). In this manner, PDs 172(1)-172(Q) configured to receive power through a powered communications port 174 can be powered from power provided to the RU 102 when connected to the powered communications port 174. In this manner, a separate power source is not required to power the PDs 172(1)-172(Q). For example, the DDS module 170 may be configured to route power to the powered communications ports 174(1)-174(Q) as described in the PoE standard.

With continuing reference to FIG. 6, one or more remote expansion units (RXUs) 164 may also be connected to the RU 102. The RXUs 164 can be provided to provide additional RF communications services through the RU 102, but remotely from the RU 102. For example, if additional RF communications bands are needed and there are no additional bands available in a distributed antenna system, the RF communications bands of an existing RU 102 can be expanded without additional communications bands by providing the RXUs 164. The RXUs 164 are connected to the distributed antenna system through the RU 102. The RXUs 164 can include the same or similar components provided in the RF communications module 168 to receive downlink RF communications signals 162D and to provide received uplink RF communications signals 162U from client devices to the distributed antenna system through the RU 102. The RXUs 164 are also power-consuming modules, and thus in this embodiment, power from the power cable 150A is routed by the RU 102 to the RXUs 164 over a power line 160. In some embodiments, the power consuming elements within the RU 102 and the RXU 164 consume less than 100 W and a single cable 150A may be used to provide power to the RU 102.

As alluded to above, the power provided on the power cable 150A in FIG. 6 may not be sufficient to provide power for the modules 168, 170, 164 and external PDs 172(1)-172(Q) provided in the RU 102. For example, eighty (80) Watts of power may be provided on the power cable 150 in FIG. 6A. However, the RF communications module 168 may consume thirty (30) Watts of power, the RXUs 164 may consume twenty (20) Watts of power, and the DDS module 170 may consume five (5) Watts of power. This is a total of fifty-five (55) Watts. In this example, twenty-five (25) Watts are available to be shared among the powered communications ports 174(1)-174(Q). However, the PDs 172(1)-172(Q) may be configured to require more power than twenty-five (25) Watts. For example, if the PDs 172(1)-172(Q) are configured according to the PoE standard, power source equipment (PSE) provided in the RU 102 to provide power to the powered communications ports 174(1)-174(Q) may be required to provide up to 15.4 Watts of power to each powered communications port 174(1)-174(Q). In this example, if more than one powered communications port 174(1)-174(Q) is provided, there will not be sufficient power to power each of the powered communications port 174(1)-174(Q) at 30 Watts (i.e., a PoE Class 4 device).

Other situations may also arise which require consumption of more power than a single cable 150 can support. Accordingly, both cables 150A and 150B may be provided from the power distribution module 130 to the RU 102 as illustrated in FIG. 5A. As illustrated, the cables 150A, 150B provide power to separate elements. By controlling which elements receive power from which cable 150A, 150B, an electrical isolation may be created between the two power cables 150A, 150B. However, if the two power cables 150A, 150B share elements at the RU 102, then cutting a return line or the like may cause too much power to be routed to the surviving power cable 150. Accordingly, the RU 102 may be equipped with a mechanism to isolate the power inputs electrically.

Figure 7:
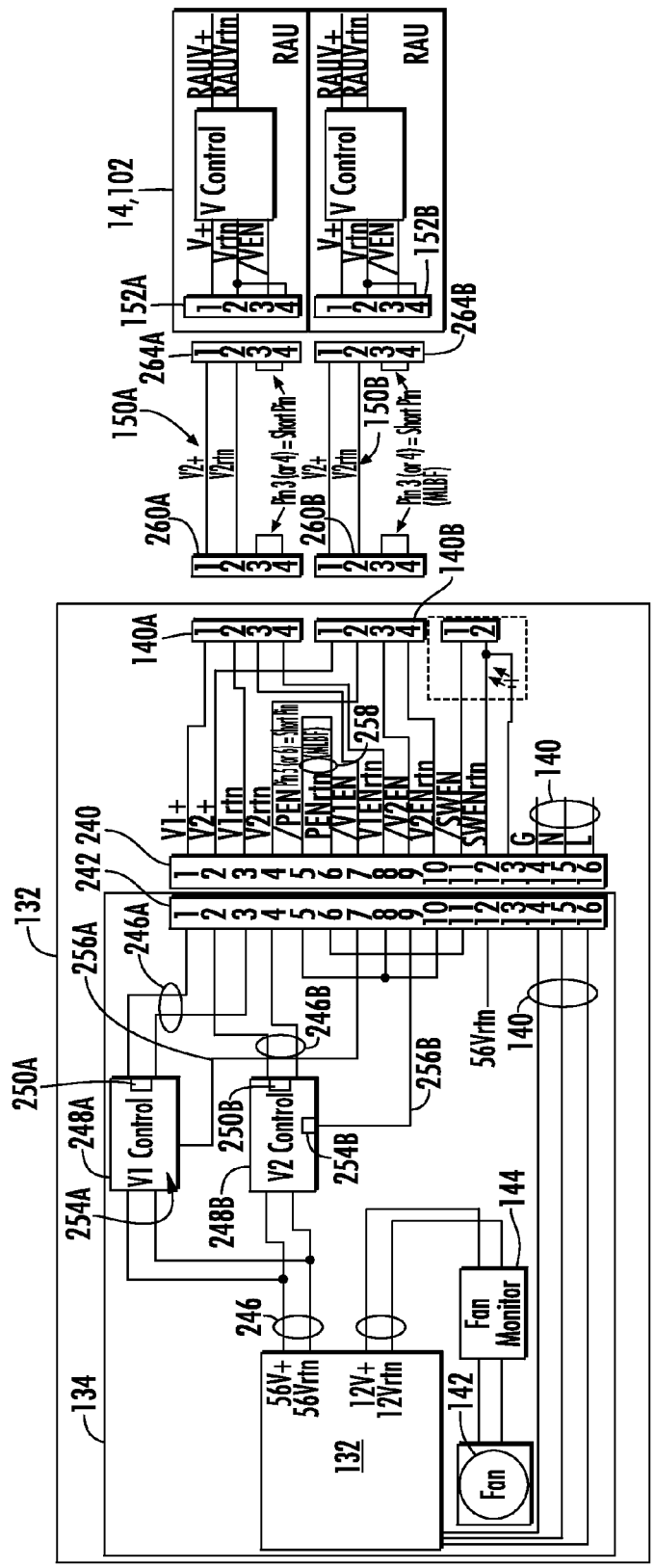
FIG. 7 is a schematic diagram of internal components of the power distribution module including a power medium and an RU.

FIG. 7 is a system level schematic diagram of exemplary internal components of the power distribution module 130 in FIG. 4 coupled to one or more RU 102 by power cables 150. Only one power distribution module 130 is shown, but more may be present as needed or desired. As shown in FIG. 7, there are two output power connectors 140A, 140B that allow two power cables 150A, 150B, via their output power connectors 260A, 260B, to be connected to the output power connectors 140A, 140B to provide power to two RUs 14, 102. Alternatively, one RU 14, 102 requiring higher power could be connected to both output power connectors 264A, 264B (FIG. 5B). The power distribution module 130 in this embodiment is configured to distribute power to multiple RUs 14, 102. Output power connectors 264A, 264B are disposed on opposite ends of the power cables 150A, 150B from output power connectors 260A, 260B. Output power connectors 264A, 264B are configured to be connected to RU power connectors 152A, 152B to provide power to the RUs 14, 102. The power cables 150A, 150B are configured such that two conductors (pins 3 and 4 as illustrated) are shorted when the output connectors 264A, 264B are electrically connected to RU power connectors 152A, 152B in the RUs 14, 102. The conductors in the RU power connectors 152A, 152B corresponding to pins 3 and 4 are shorted inside the RU 14, 102.

With continuing reference to FIG. 7, when the output power connectors 260A, 260B are electrically connected to the power cables 150A, 150B, the short created between pins 3 and 4 in the RU power connectors 152A, 152B causes pins 3 and 4 to be shorted in the output power connectors 260A, 260B coupled to the midplane interface connector 240 and the connector 242 of the power distribution module 130, and the output power connectors 252A, 252B. This is a power enable/disable feature 258. In this regard, the power enable ports 254A, 254B via power enable lines 256A, 256B are activated, thereby activating the power controllers 248A, 248B to provide output power 246 to the connector 242 through midplane interface connector 240 and to the RUs 14, 102 via the power cables 150A, 150B. When the output power connectors 260A, 260B or output power connectors 264A, 264B are disconnected, pins 3 and 4 on the output power connectors 252A, 252B are not short circuited. This causes the power enable ports 254A, 254B via power enable lines 256A, 256B to be deactivated, thereby causing the power controllers 248A, 248B to deactivate output power 246 to the connector 242 through midplane interface connector 240 and the output power connectors 252A, 252B, which may be electrically connected to the power cables 150A, 150B. In this regard, connection and disconnection of the RUs 14, 102 to the output power connectors 252A, 252B causes the power controllers 248A, 248B to activate and deactivate output power 246, respectively.

With continuing reference to FIG. 7, an alternative circuit configuration 268 may be provided. Instead of pins 3 and 4 being shorted together in the power cables 150A, 150B, pins 3 and 4 may be shorted in the RU power connectors 152A, 152B of the RUs 14, 102. This will cause a short circuit between pins 3 and 4 in the power cables 150A, 150B when the output power connectors 264A, 264B of the power cables 150A, 150B are connected to the RU power connectors 152A, 152B of the RUs 14, 102. The alternative circuit configuration 268 provides extra conductors in the power cables 150A, 150B that can increase cost in the power cable 150A, 150B. When connected, the power enable ports 254A, 254B via power enable lines 256A, 256B are activated, thereby activating the power controllers 248A, 248B to provide output power 246 to the connector 242 through midplane interface connector 240 and to the RUs 14, 102 via the power cables 150A, 150B. When the output power connectors 260A, 260B or output power connectors 264A, 264B are disconnected, pins 3 and 4 on the output power connectors 252A, 252B are not short circuited. This causes the power enable ports 254A, 254B via power enable lines 256A, 256B to be deactivated, thereby causing the power controllers 248A, 248B to deactivate output power 246 to the connector 242 through midplane interface connector 240 and the output power connectors 252A, 252B, which may be electrically connected to the power cables 150A, 150B. In this regard, connection and disconnection of the RUs 14, 102 to the output power connectors 252A, 252B causes the power controllers 248A, 248B to activate and deactivate output power 246, respectively.

With continuing reference to FIG. 7, output power 246A, 246B is enabled by the power controllers 248A, 248B when the power distribution module 130 connector 242 is connected to midplane interface connector 240 in the power supply unit 132. In this regard, a short is created between pins 11 and 12 in the midplane interface connector 240 when the power distribution module 130 connector 242 is connected to the midplane interface connector 240 through the power enable/disable feature 258. The power enable ports 254A, 254B via power enable lines 256A, 256B are activated, thereby activating the power controllers 248A, 248B to provide output power 246 to the connector 242 through midplane interface connector 240 and to the RUs 14, 102 via the power cables 150A, 150B. Similarly, output power 246A, 246B is disabled by the power controllers 248A, 248B when the power distribution module 130 connector 242 is disconnected from midplane interface connector 240 in the power supply unit 132. In this regard, pins 11 and 12 are no longer shorted. This causes the power enable ports 254A, 254B via power enable lines 256A, 256B to be deactivated, thereby causing the power controllers 248A, 248B to deactivate output power 246 to the connector 242 through midplane interface connector 240 and the output power connectors 252A, 252B, which may be electrically connected to the power cables 150A, 150B. In this regard, connection and disconnection of the power distribution module 130 to the power supply unit 132 causes the power controllers 248A, 248B to activate and deactivate output power 246, respectively.

The power converter 244 can be provided to produce any voltage level of DC power desired. In one embodiment, the power converter 244 can produce relatively low voltage DC current. A low voltage may be desired that is power-limited and Safety Extra Low Voltage (SELV) compliant, although such is not required. For example, according to Underwriters Laboratories (UL) Publication No. 60950, SELV-compliant circuits produce voltages that are safe to touch both under normal operating conditions and after faults. In this embodiment, two power controllers 248A, 248B are provided so no more than 100 Watts (W) in this example are provided over output power ports 250A, 250B to stay within the Underwriters Laboratories (UL) Publication No. 60950, and provide a SELV-compliant circuit. The 100 VA limit discussed therein is for a Class 2 DC power source, as shown in Table 11(B) in NFPA 70, Article 725. Providing a SELV compliant power converter 244 and power supply unit 132 may be desired or necessary for fire protection and to meet fire protection and other safety regulations and/or standards. The power converter 244 is configured to provide up to 150 W of power in this example. The 150 W is split among the output power ports 250A, 250B.

Figure 8:
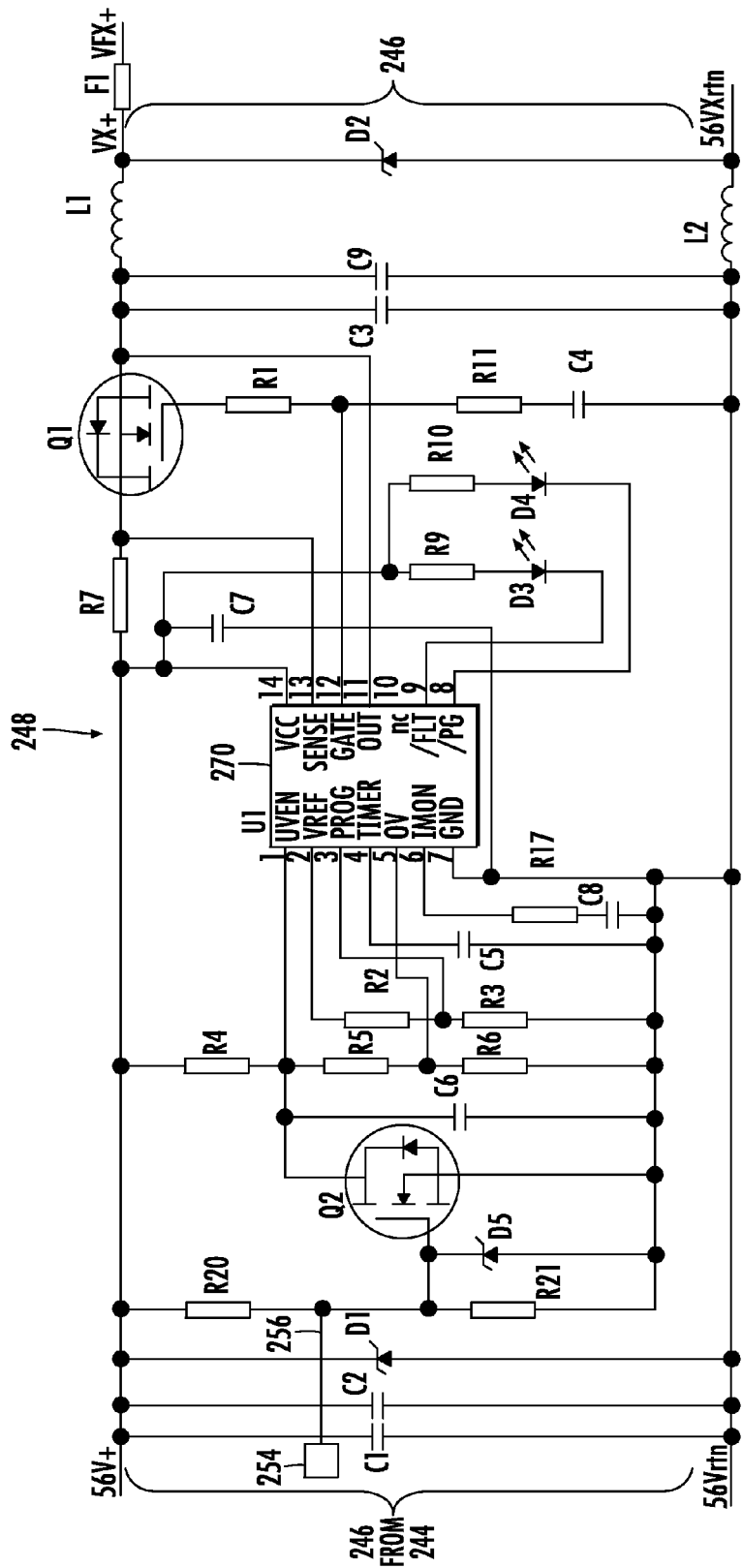
FIG. 8 is a schematic diagram of the power controller in the power distribution module.

FIG. 8 is a schematic diagram of an exemplary power controller 136, 248 that may be provided in the power distribution module 130 in FIG. 7. Common element numbers between FIG. 8 and FIG. 7 indicate common elements and thus will not be re-described. As illustrated in FIG. 8, an integrated circuit (IC) chip 270 is provided to control wherein output power 246 from the power converter 244 will be provided to the connector 242 of the power distribution module 130 configured to be connected to the midplane interface connector 240 of the power supply unit 132.

Figure 9A:
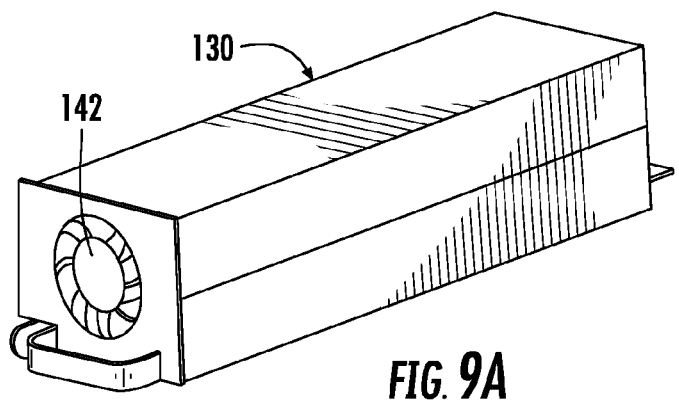
FIG. 9A illustrates a front, side perspective view of an exemplary power distribution module with a cover installed.
Figure 9B:
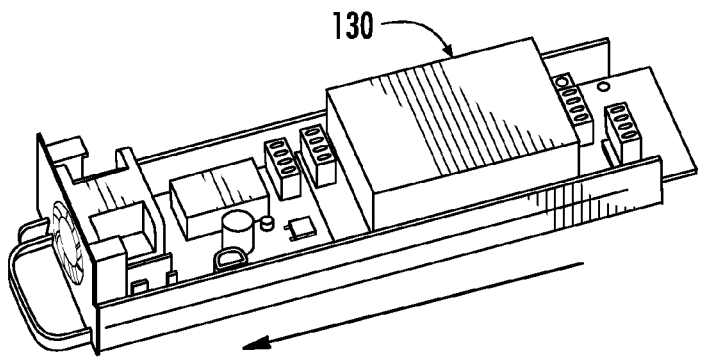
FIG. 9B illustrates a front, side perspective view of the power distribution module in FIG. 9A with the cover removed.
Figure 9C:
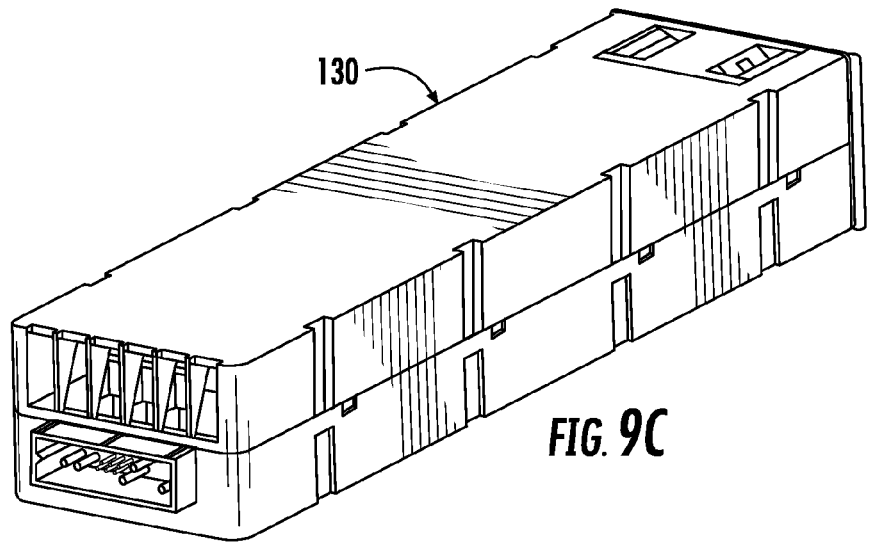
FIG. 9C illustrates a rear, side perspective view of the power distribution module in FIG. 9A.

FIG. 9A illustrates a front, side perspective view of an exemplary power distribution module 130 with a cover installed. FIG. 9B illustrates a front, side perspective view of the power distribution module 130 in FIG. 9A with the cover removed. FIG. 9C illustrates a rear, side perspective view of the power distribution module 130 in FIG. 9A.

Figure 10:
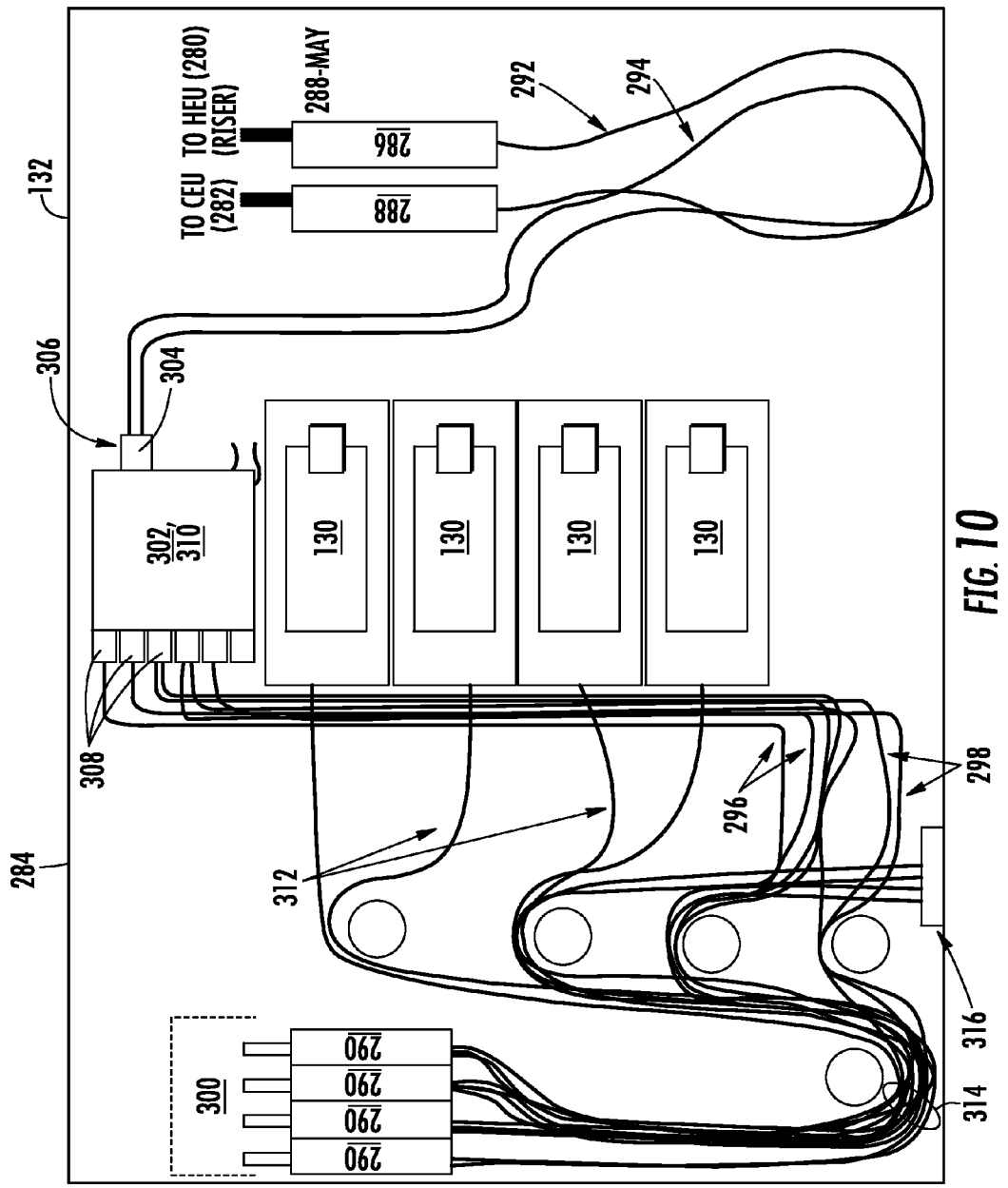
FIG. 10 is a schematic diagram of an exemplary power unit configured to support one or more power distribution modules to provide power to RUs in a distributed antenna system.

FIG. 10 is a schematic diagram of an exemplary power supply unit 132 configured to support one or more power distribution modules 130 to provide power to RUs 14, 102 in a distributed antenna system. In this regard, FIG. 10 is a schematic top cutaway view of a power supply unit 132 that may be employed in the exemplary RoF distributed communication system. The power supply unit 132 provides power to remote units, and connectivity to a first central unit, in a manner similar to the power unit 70 illustrated in FIG. 3. The power supply unit 132, however, may also provide connectivity between RUs 14, 102 and a second central unit 282 (not illustrated). The second central unit 282 can be, for example, a unit providing Ethernet service to the remote units. For the purpose of this embodiment, the first central unit will be referred to as the HEU 280, and the second central unit will be referred to as a central Ethernet unit, or CEU 282. The CEU 282 can be collocated with the power unit 132, as for example, in an electrical closet, or the CEU 282 can be located with or within the HEU 280.

According to one embodiment, if Ethernet or some other additional service (e.g. a second cellular communication provider) is to be provided over the system 10, four optical fibers (two uplink/downlink fiber pairs) may be routed to each remote unit location. In this case, two fibers are for uplink/downlink from the HEU 280 to the remote unit, and two fibers are for uplink/downlink from the CEU 282. One or more of the remote units may be equipped with additional hardware, or a separate, add-on module designed for Ethernet transmission to which the second fiber pair connects. A third fiber pair could also be provided at each remote unit location to provide additional services.

As illustrated in FIG. 10, the power unit 132 may be provided in an enclosure 284. The enclosure 284 may be generally similar in function to the wall mount enclosure, except that one or more sets of furcations in the power unit 132 can be internal to the enclosure 284. One or more power units 132 can be located on a floor of an office building, a multiple dwelling unit, etc. to provide power and connectivity to remote units on that floor. The exemplary power unit 132 is intended as a 1 U rack mount configuration, although the power unit 132 may also be configured as a 3 U version, for example, to accommodate additional remote units.

A furcation 286, located inside the enclosure 284, of the riser cable 64 (e.g., FIG. 2A) breaks pairs of optical fibers from the riser cable 64 that are connected at an uplink end to the HEU 280, to provide optical communication input links to the HEU 280. The furcation 286 can be a Size 2 Edge™ Plug furcation, Part 02-013966-001 available from Corning Cable Systems LLC of Hickory N.C. If the CEU 282 is located with the HEU 280, optical fibers connecting the CEU 282 to the power unit 132 can be included in the riser cable 84. A furcation 288 breaks fiber pairs from the CEU 282 to provide optical communication input links to the CEU 282. The furcation 288 can be a Size 2 Edge™ Plug furcation, Part 02-013966-001 available from Corning Cable Systems LLC.

The optical communication input links from the HEU 280 and the CEU 282 are downlink and uplink optical fiber pairs to be connected to the remote units. In this embodiment, the furcated leg contains eight (8) optical fiber pairs to provide connections from the CEU 282 and HEU 280 to up to four (4) remote units, although any number of fibers and remote units can be used. The legs are connected to the power unit 132 at furcations 290, which can be arranged as two rows of four 2-fiber connectors on one face of the enclosure 284. The illustrated furcations 290 are internally mounted in the enclosure 284. In an alternative embodiment, the furcations 290 can be mounted on a tray 300 that is mounted to an exterior of the enclosure 284.

For communication between the HEU 280 and the remote units, the furcated leg 292 from the furcation 286 can be pre-connectorized with a fiber-optic connector to facilitate easy connection to a first adapter module 302 within the power unit 132. The first adapter module 302 includes a multi-fiber connector 304 that receives the connector of the furcated leg 292. The connector 304 can be, for example, a 12-fiber MTP connector. A series of six 2-fiber connectors 308, for example, at the other side of the first adapter module 302, connects to fiber pairs 296 from each furcation 290. Each fiber pair 296 can be connectorized with a 2-fiber connector that connects to one of six connectors 308 of the first adapter module 302. In this arrangement, the first adapter module 302 has the capacity to receive twelve fibers at the connector 304, and six separate connectorized fiber pairs 296. This exemplary arrangement allows for optical communication between six remote units and the HEU 280, although only four such connections are shown in the illustrated embodiment. The first adapter module 302 can be, for example, a 12/F LC EDGE™ Module/07-016841 for riser connection available from Corning Cable Systems LLC.

For communication between the CEU 282 and the remote units, or an add-on module of a remote unit, etc., the furcated leg 294 from the furcation 288 can be pre-connectorized with a fiber-optic connector to facilitate easy connection to a second adapter module 310 within the power unit 132. In the illustrated embodiment, the second adapter module 310 is directly beneath the first adapter module 302, and thus is not visible in FIG. 10. The second adapter module 310 includes a multi-fiber connector 306 that receives the connector of the leg 294. The connector 306 can be, for example, a 12-fiber MTP connector. A series of six 2-fiber connectors, for example, at the other side of the second adapter module 310, connects to fiber pairs 298 from each furcation 290. Each fiber pair 298 can be connectorized with a 2-fiber connector that connects to one of six connectors of the second adapter module 310. In this arrangement, the second adapter module 310 has the capacity to receive twelve fibers at the connector 306, and six separate connectorized fiber pairs 298. This arrangement allows for optical communication between, for example, six Ethernet modules that are collocated or within respective remote units, and the CEU 282, although only four such connections are shown in the illustrated embodiment. The second adapter module 310 can be, for example, a 12/F LC EDGE™ Module/07-016841 for riser connection available from Corning Cable Systems LLC.

One or more power distribution modules 130 can be included in the enclosure 284. According to one embodiment, one power distribution module 130 can be connected to each remote unit by a pair of electrical conductors. Electrical conductors include, for example, coaxial cable, twisted copper conductor pairs, etc. Each power distribution module 130 is shown connected to a twisted pair of conductors 312. The power distribution modules 130 plug into a back plane and the conductors that power the remote units connect to the back plane with a separate electrical connector from the optical fibers, although hybrid optical/electrical connectors could be used. Each cable extending to remote units can include two fibers and two twisted copper conductor pairs, although additional fibers and electrical conductors could be included.

The power distribution modules 130 are aligned side-by-side in the enclosure 284. One power distribution module 130 can be assigned to each remote unit, based upon power requirements. If an add-on module, such as an Ethernet module, is included at a remote unit, a second power distribution module 130 can be assigned to power the add-on module. If the remote unit and add-on module power budgets are low, a single power distribution module 130 may suffice to power that location. The allocation of power and optical connectivity is accordingly adaptable depending upon the number and power requirements of remote units, additional modules, and hardware, etc. The power distribution modules 130 can be connected to a power bus that receives local power at the power unit 132 location.

As previously discussed, the power distribution modules 130 may include a fan 142 that is powered by the power distribution module 130. Each power distribution module 130 can have two output plugs, to allow for powering of high or low power remote units. In FIG. 10, unused twisted conductor pairs 314 are parked at location 316. The unused twisted conductor pairs 314 could be used to power Power-over-Ethernet applications, etc., although that might require fewer remote units to be used, or additional power distribution modules 130.

The illustrated power distribution modules 130 can have a power output of 150-200 W. The power distribution modules 130 can operate without fans 142, but the power ratings may drop, or a larger enclosure space may be required to ensure proper cooling. If no fan 142 is used, the power ratings can drop. UL requirements can be followed that limit the power distribution to 100 VA per remote unit array. In an alternate 1 U module configuration, the power unit 132 could have six power distribution modules 130 and no adapter modules. The modules could supply, for example, remote units with greater than 80 W loads. In an alternate 3 U module configuration, the power unit 132 could have twelve power distribution modules 130 and can support twelve remote units.

The power unit 132 discussed herein can encompass any type of fiber-optic equipment and any type of optical connections and receive any number of fiber-optic cables or single or multi-fiber cables or connections. The power unit 132 may include fiber-optic components such as adapters or connectors to facilitate optical connections. These components can include, but are not limited to the fiber-optic component types of LC, SC, ST, LCAPC, SCAPC, MTRJ, and FC. The power unit 132 may be configured to connect to any number of remote units. One or more power supplies either contained within the power supply unit 132 or associated with the power supply unit 132 may provide power to the power distribution module 130 in the power supply unit 132. The power distribution module 130 can be configured to distribute power to remote units with or without voltage and current protections and/or sensing. The power distribution module contained in the power unit 132 may be modular where it can be removed and services or permanently installed in the power unit 132.

Figure 11:
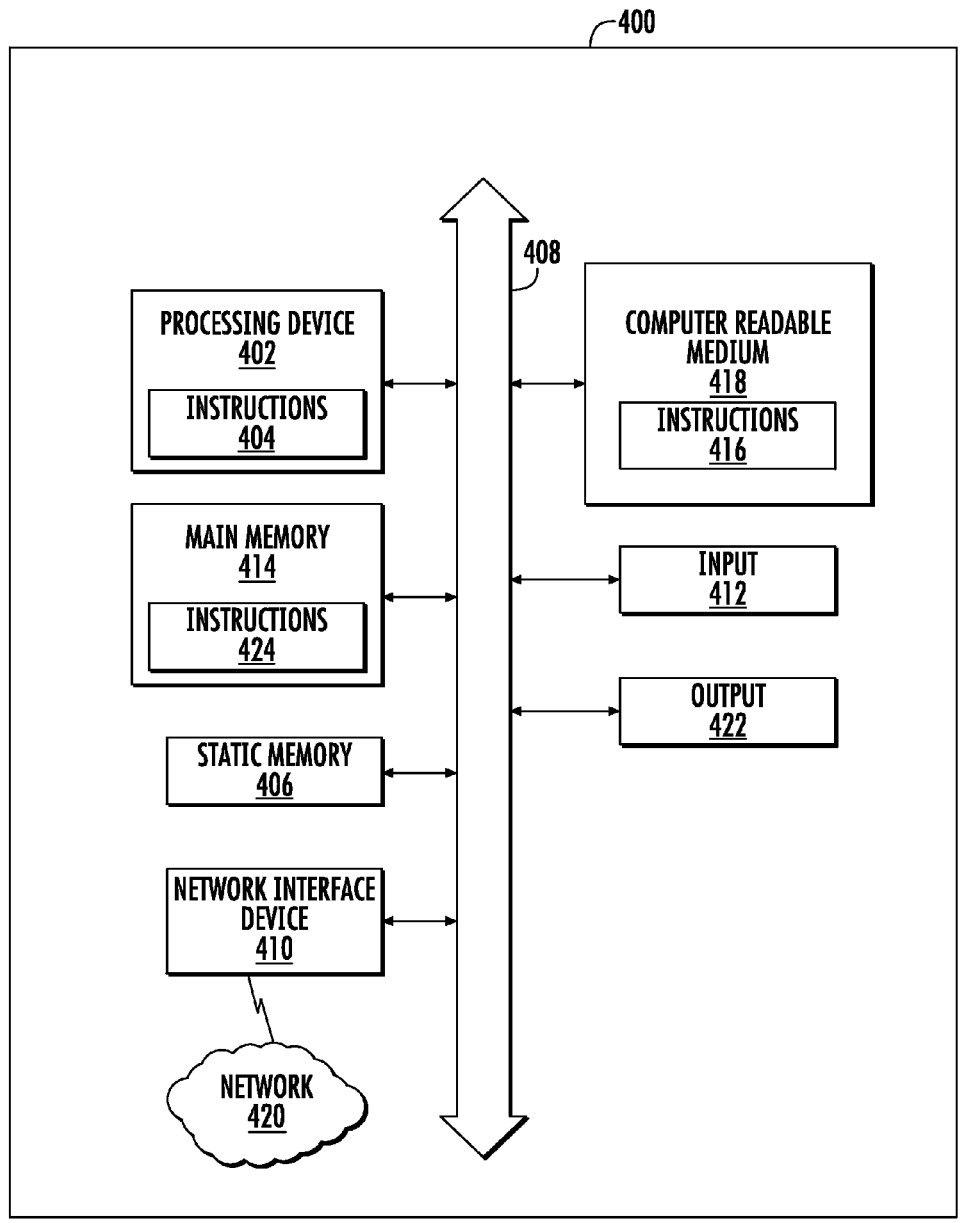
FIG. 11 is a schematic diagram of a generalized representation of an exemplary computer system that can be included in the power distribution modules disclosed herein, wherein the exemplary computer system is adapted to execute instructions from an exemplary computer-readable media.

FIG. 11 is a schematic diagram representation of additional detail regarding an exemplary computer system 400 that may be included in the power distribution module 130 and provided in the power controller 248. The computer system 400 is adapted to execute instructions from an exemplary computer-readable medium to perform power management functions. In this regard, the computer system 400 may include a set of instructions for causing the power controller 248 to enable and disable coupling of power to the output power port 250, as previously described. The power controller 248 may be connected (e.g., networked) to other machines in a LAN, an intranet, an extranet, or the Internet. The power controller 248 may operate in a client-server network environment, or as a peer machine in a peer-to-peer (or distributed) network environment. While only a single device is illustrated, the term "device" shall include any collection of devices that individually or jointly execute a set (or multiple sets) of instructions to perform any one or more of the methodologies discussed herein. The power controller 248 may be a circuit or circuits included in an electronic board card, such as a printed circuit board (PCB) as an example, a server, a personal computer, a desktop computer, a laptop computer, etc.

The exemplary computer system 400 of the power controller 248 in this embodiment includes a processing device or processor 402, a main memory 414 (e.g., read-only memory (ROM), flash memory, dynamic random access memory (DRAM) such as synchronous DRAM (SDRAM), etc.), and a static memory 406 (e.g., flash memory, static random access memory (SRAM), etc.), which may communicate with each other via the data bus 408. Alternatively, the processing device 402 may be connected to the main memory 414 and/or static memory 406 directly or via some other connectivity means. The processing device 402 may be a controller, and the main memory 414 or static memory 406 may be any type of memory, each of which can be included in the power controller 248.

The processing device 402 represents one or more general-purpose processing devices such as a microprocessor, central processing unit, or the like. More particularly, the processing device 402 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 is configured to execute processing logic in instructions 404 for performing the operations and steps discussed herein.

The computer system 400 may further include a network interface device 410. The computer system 400 also may or may not include an input 412 to receive input and selections to be communicated to the computer system 400 when executing instructions. The computer system 400 also may or may not include an output 422, including but not limited to a display, a video display unit, an alphanumeric input device (e.g., a keyboard), and/or a cursor control device (e.g., a mouse).

The computer system 400 may or may not include a data storage device that includes instructions 416 stored in a computer-readable medium 418. The instructions 416 may also reside, completely or at least partially, within the main memory 414 and/or within the processing device 402 during execution thereof by the computer system 400, the main memory 414 and the processing device 402 also constituting computer-readable medium 418. The instructions 416 may further be transmitted or received over a network 420 via the network interface device 410.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

The distributed antenna systems could include any type or number of communications mediums, including electrical conductors, optical fiber, and air (i.e., wireless transmission). The systems may distribute any type of communications signals, including but not limited to RF communications signals and digital data communications signals, examples of which are described in U.S. patent application Ser. No. 12/892,424, incorporated herein by reference in its entirety. Multiplexing, such as WDM and/or FDM, may be employed in any of the distributed antenna systems described herein, such as according to the examples provided in U.S. patent application Ser. No. 12/892,424.

Although specific terms are employed herein, they are used in a generic and descriptive sense only and not for purposes of limitation.

What is claimed is:
1. A distributed antenna system, comprising:
a power distribution module comprising:
    a power supply configured to provide a plurality of power outputs; and
    a plurality of power controllers each connected to a respective one of the plurality of power outputs in parallel to provide split power from the power supply to a respective power controller output;
    each power controller output coupled to a respective power output port, at least two power output ports configured to be coupled to a single remote unit in a first connection configuration and each power controller output configured to be coupled to a respective remote unit in a second configuration; and
a remote unit comprising:
    a first power input configured to receive a first power signal from a power distribution module through a first power medium;
    a second power input electrically isolated from the first power input, the second power input configured to receive a second power signal from the power distribution module through a second power medium;
    a communications module configured to receive power from at least one of the first power input and the second power input to communicate radio frequency (RF) communications with client devices through an antenna defining an antenna coverage area associated with the remote unit; and
    at least one wired service port configured to couple to at least one of the first power input and the second power input to distribute power to an external module coupled to the at least one wired service port.

2. The distributed antenna system of claim 1, wherein the first power input is configured to receive less than 100 Watts of power.

3. The distributed antenna system of claim 1, wherein the second power input is configured to receive less than 100 Watts of power.

4. The distributed antenna system of claim 1, further comprising an optical port configured to couple to an optical communications medium for receipt and transmission of optical communication signals.

5. The distributed antenna system of claim 4, further comprising a converter adapted to convert RF communications to optical communication signals.

6. The distributed antenna system of claim 1, wherein the wired service port provides a wired communication port to the client device.

7. A distributed communication system comprising:
   a power distribution module for distributing power, comprising:
      a power supply configured to provide a plurality of power outputs; and
      a plurality of power controllers each connected to a respective one of the plurality of power outputs in parallel to provide split power from the power supply to a respective power controller output;
      each power controller output coupled to a respective power output port, at least two power output ports configured to be coupled to a single remote unit in a first connection configuration and each power controller output configured to be coupled to a respective remote unit in a second configuration; and
   a remote unit (RU), comprising:
      a first power input configured to receive a first power signal from the power distribution module through a first power medium;
      a second power input electrically isolated from the first power input, the second power input configured to receive a second power signal from the power distribution module through a second power medium;
      a communications module configured to receive power from at least one of the first power input and the second power input to communicate radio frequency (RF) communications with client devices through an antenna defining an antenna coverage area associated with the remote unit; and
      at least one wired service port configured to coupled to at least one of the first power input and the second power input to distribute power to an external module coupled to the at least one wired service port.

8. The system of claim 7, wherein the power supply is configured to generate at least 150 Watts.

9. The system of claim 7, wherein the power supply is configured to generate approximately 200 Watts.

10. The system of claim 7, further comprising a plurality of communication links each configured to carry radio-frequency communications signals from head-end equipment to a plurality of remote units.

11. The system according to claim 7, wherein power supplied by each power output port is 100 Watts or less.

12. The system of claim 11, wherein each power controller limits the power supplied to each power output port to 100 Watts or less.

13. The system according to claim 7, wherein each respective power output port comprises a connector.

14. The system of claim 13, wherein in the first configuration the at least two power output ports are coupled to the remote unit using two connectors.

15. The system of claim 7, further comprising a second RU and wherein the plurality of power outputs comprises two power outputs and each respective power output port is coupled to a respective RU in the second configuration.

16. A distributed antenna system for distributing communications and power signals comprising:
   one or more remote units (RU), each RU comprising:
      a first power input configured to receive a first power signal from a power distribution module through a first power medium;
      a second power input electrically isolated from the first power input, the second power input configured to receive a second power signal from the power distribution module through a second power medium;
      a communications module configured to receive power from at least one of the first power input and the second power input to communicate radio frequency (RF) communications with client devices through an antenna defining an antenna coverage area associated with the remote unit; and
      at least one wired service port configured to couple to at least one of the first power input and the second power input to distribute power to an external module coupled to the at least one wired service port;
   head-end equipment comprising a radio-frequency (RF) communications interface configured to:
      receive downlink RF communication signals for at least one RF communications service;
      distribute the downlink RF communications signals to the one or more remote units over a communications medium; and
   the one or more remote units configured to:
      receive the downlink RF communication signals from the head-end equipment for the at least one RF communications service; and
      distribute the downlink RF communications signals to at least one client device;
   the power distribution module disposed between the head-end equipment and the at least one remote unit for distributing power to the at least one remote unit, comprising:
      a communications interface configured to receive and pass through the communications medium to the at least one remote unit;
      a power supply configured to provide a plurality of power outputs; and
      a plurality of power controllers each connected to a respective one of the plurality of power outputs in parallel to provide split power from the power supply to a respective power controller output;
      each power controller output coupled to a respective power output port, at least two power output ports configured to be coupled to a single one of the one or more remote units in a first connection configuration and each power output controller output configured to be coupled to a respective remote unit of the one or more remote units in a second configuration.

17. The distributed antenna system of claim 16, wherein the head-end equipment is further configured to:
   receive uplink RF communication signals for the at least one RF communications service from the one or more remote units; and
   distribute the uplink RF communication signals for the at least one RF communications service to at least one network.

18. The distributed antenna system of claim 16, wherein each of the one or more remote units is configured to consume less than 100 Watts in the second configuration.

19. The distributed antenna system of claim 16, wherein at least one of the one or more remote units is configured to consume more than 100 Watts in the first configuration.

20. The distributed antenna system of claim 16, wherein the communications medium comprises an optical fiber medium.

* * * * *